8866X
T. M. Southwick,
Heating Stove.
Patented June 6, 1835.
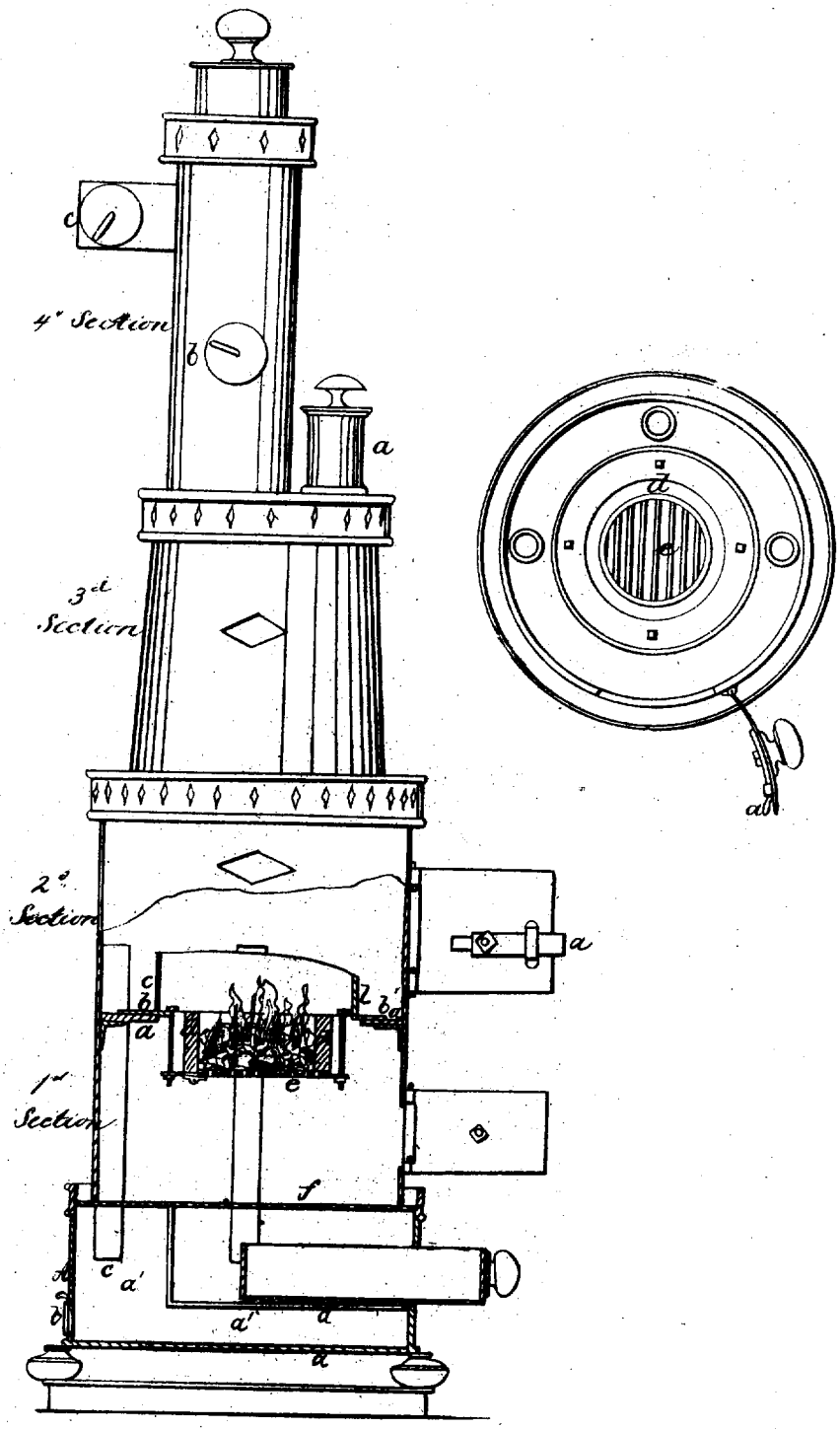

aw14. 8866X

June 6. 1835 527

Thomas M. Southwick, of Troy, New York, Letters Patent.

The schedule referred to in these Letters Patent and making part of the same, containing a description in the words of the said Thomas M. Southwick, himself of his improvement in a wrought iron stove for burning anthracite coal called Southwick's Pyra-midal Stove –

Be it known that I Thomas M. Southwick of Troy Rensselaer County, State of New York, have made an improvement in the useful arts, being a wrought iron stove for burning Anthracite coal called "Southwick's Pyramidal Stove" which is described as follows, This stove consists of four sections; The first or lower section, is made circular of any convenient size; and is fastened to the base, by screws passing thro ears at the bottom, and thro brass or iron balls to the under side of the base, and fastened by nuts on the under side, The base is overlaid with brass or iron This section has a double bottom, and double sides making an air tight vessel, leaving a vacant space for the drawer to receive the ashes, The drawer is faced with brass or iron, the handle of brass or iron and made fast to the drawer with a screw passing through the handle and fastened with a nut inside, A brass or iron rim on the top of this section and a small sliding door on the back side, Into this air-tight chamber are introduced three tubes more or less reaching into the second section, for conveying warm air downwards into the close chamber below, by which means the air near the floor is warmed, The second section has two doors one at the bottom and one about two thirds distance from the bottom to the top, with hinges and hooks, the bottom door faced with brass or iron, & the handle made fast to the door by a screw, and nut, the same as the front of the drawer in the

8866X first section, The upper door has a slide bolt, a brass or iron
handle, a screw passing through the handle and through the bolt
and fastened inside by a nut there is a space cut in the door
sufficient to give play to the bolt, with isinglass in the top of the door
and isinglass in the stove on each side of the door on an equal line
with the glass, on the top of the door, about half way between the
doors are three or more iron knees rivetted to the stove inside
which support a wrought iron rim round the inside of the stove
This rim supports a cast iron horizontal rim, with a small
ring on the rim, on the under side and a perpendicular rim
on the upper side leaving a space between the perpendicular
rim and the stove for three or more iron tubes to pass down
into the vacuum in the first section, The top of the tubes are
to be of equal hight with the perpendicular rim, In the space
inside of the horizontal cast rim is a furnace of soap stone cased
with wrought iron. At the bottom of the furnace is an iron
drop grate with a hinge and button to hold up the drop, the
furnace is confined to the cast iron rim by four screws, passing
through the horizontal rim inside of the perpendicular rim &
outside of the ring, on the underside of the Rim & through
the rim of the grate in the underside of the furnace & made
fast by nuts on the under side of the grate. On the bottom of
this section is a sifter of the size of the drawer in the first
section. The third section has isinglass in front, a boiler
inside let in at the top, with a cover. a brass or iron handle;
holes in the cover to pass off steam, the bottom ornamented with
a brass or iron rim setting off from the stove, The fourth
section has a damper, near the top of the boiler in the third
section and made fast by brass or iron handles, on the outside
of the stove, on the top is a brass or iron ball or urn or one or
more rising from the top. the bottom and top ornamented with a
brass or iron rim setting off from the stove, about two thirds
the distance from the bottom to the top of this section is a a collar containing a damper, and made fast outside with brass or iron handles, & outer collar enters the stove pipe. —
Operation, The fuel being introduced into the grate or furnace in the second section at the door with charcoal & other materials proper for kindling and fire applied, the door is shut; draft is given from below, and the anthracite coal ignited, the heat ascends into the upper sections, heating the water in the boiler and also descends into the close chamber, below by the tubes — warming the air in the lower part of the room, which will be very convenient for the feet the dampers being applied according to their several uses
By means of the soap stone lining and construction of the furnace, the boiler containing water, the sides of the stove, will never become red hot; thus preventing the oxygen of the air in the Room from being destroyed, as is the case with common stoves, on account of its affinity to red hot iron, —
At night the drop grate, is let down by turning a button, & the contents sifted by the sifter, the ashes falling into the drawer below, the cinders separated and the coal remaining put into the grate or furnace next morning, The invention here claimed and desired to be secured by Letters Patent, consists in the arrangement, and adaptation of the several parts, of the stove so as to produce the one described, but I particularly claim the tubes which convey the heated air downward into the close vessel below for warming the feet, & the construction of the furnace containing the coal, For a further illustration of my invention I refer to the model and drawing of the same deposited in the Patent Office —

Witnesses
Clement T. Coote
S. Alfred Elliot

Thomas M. Southwick

Exd
W.C.

(302 W 85)